United States Patent
Sharma

(10) Patent No.: US 11,520,594 B2
(45) Date of Patent: Dec. 6, 2022

(54) MULTIPLE CLIENT SUPPORT ON DEVICE-BASED LWM2M

(71) Applicant: T-Mobile USA, Inc., Bellevue, WA (US)

(72) Inventor: Nandita Sharma, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 658 days.

(21) Appl. No.: 16/509,209

(22) Filed: Jul. 11, 2019

(65) Prior Publication Data

US 2021/0011733 A1 Jan. 14, 2021

(51) Int. Cl.
  *G06F 9/44* (2018.01)
  *G06F 9/4401* (2018.01)
  *H04L 9/08* (2006.01)

(52) U.S. Cl.
  CPC ............ *G06F 9/4401* (2013.01); *H04L 9/088* (2013.01)

(58) Field of Classification Search
  CPC ............................... G06F 9/4401; H04L 9/088
  See application file for complete search history.

(56) References Cited

U.S. PATENT DOCUMENTS

| | | |
|---|---|---|
| 2016/0065556 A1 | 3/2016 | Sasin |
| 2018/0359621 A1 | 12/2018 | Singhal |
| 2019/0045033 A1* | 2/2019 | Agerstam ............... H04L 67/10 |
| 2019/0305962 A1* | 10/2019 | Takemori .............. H04L 9/3234 |

OTHER PUBLICATIONS

Extended European Search Report for App. No. EP20181211.2, dated Oct. 30, 2020, 7 pages.

* cited by examiner

*Primary Examiner* — Zahid Choudhury
(74) *Attorney, Agent, or Firm* — Loeb & Loeb LLP

(57) ABSTRACT

A module may have more than one device, such as an IoT device, that requires bootstrapping. A first device may be provisioned with a pre-shared key (PSK). The first device, such as an IoT device, may bootstrap in a conventional manner using its PSK. A second device without a PSK may be added to the module post-manufacture. The first device may share registration details with the second device and also with an LwM2M server. When contacted by the second device, the LwM2M server may associate the second device with the first device and treat them as one from an operational standpoint, reducing the need for pre-shared keys across domains lacking an existing trust relationship.

20 Claims, 2 Drawing Sheets

MULTIPLE CLIENT SUPPORT ON DEVICE-BASED LWM2M

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internet of Things (IoT) devices may use a lightweight machine-to-machine (LwM2M) protocol for communication with a server. LwM2M may be used to provide device management functionality, to transfer service data between devices and networks, and may be extended to support most applications. However, there are limitations that may impede life-cycle maintenance of certain devices.

SUMMARY

A first IoT module bootstrapped in a device may share its credentials with a second IoT module that does not have a pre-shared key (PSK) needed for registration with an operational server. The second IoT module may use the shared credential along with its own identification information to register with the operational server. Because the second IoT module presented the credential of the first IoT module, the operational server may associate operations of the two IoT modules.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

LwM2M is a protocol from the Open Mobile Alliance for use in machine-to-machine and Internet of Things device management. LwM2M defines an application layer communication protocol between an LwM2M server and a LwM2M client located on an LwM2M device. The protocol is well suited for resource-constrained devices, which includes many IoT devices. While the descriptions below are directed to an exemplary implementation incorporating LwM2M-based protocols, the techniques described therein are equally applicable to other protocols and devices that may require multiple client support in a device.

Bootstrapping, as defined by the IoT@Work project, is the process by which the state of the device, a subsystem, network, or an application changes from not operational to operational. For the purpose of this disclosure, bootstrapping will be considered to include obtaining and installing elements including, but not limited to, secret keys and a server URL. This provisioning process allows authentication and communication with the servers necessary so that an IoT device to perform its designated function or functions. This may involve authentication of a pre-established identity or creation of a new identity. Using a non-IoT example corresponding to bootstrapping, a user wishing to create and use a new email address must first navigate to the website supporting the registration process. The user must then create a unique identifier and select a password for the account. Thereafter, the user can enter the user name and password to access the email account. These two steps may be considered bootstrapping while composing, sending, and accessing emails may be considered use of the email service. Bootstrapping for an IoT device may include authentication to a network as well as receiving authorization and credentials used for later secure communication during beneficial use.

Figure 1:
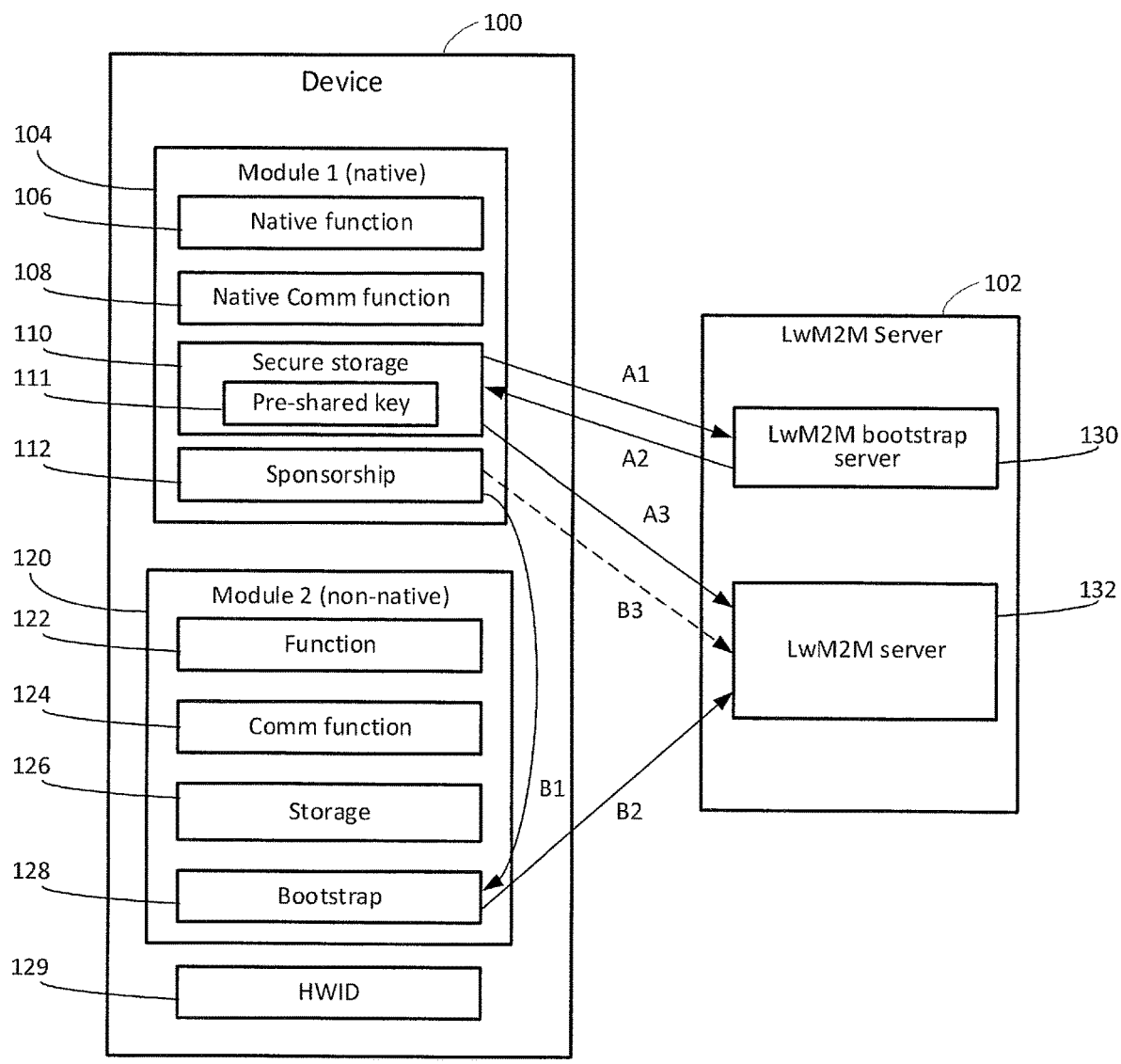
FIG. 1 is a system illustration of an embodiment of an IoT device having multiple functional modules in accordance with the current disclosure.

FIG. 1 illustrates an exemplary device 100 that supports operation of one or more IoT modules 104, 120. A lightweight machine-to-machine (LwM2M) server 102 may support both the bootstrapping and operation of the IoT modules 104, 120 via a bootstrap server 130 and an operational server 132. In an embodiment, the LwM2M server 102 may include support for one or more applications or services, such as a thermostat, a home security system, a kitchen appliance, an automobile sub-system or any of a number of commercial and industrial applications, to name a few possible examples.

The IoT native module 104 may support a client application or service (native function 106) and may bootstrap with a bootstrap server 130 using a native communication function 108. The native communication function 108 may be or include WiFi (802.11), Bluetooth, cellular data, or a combination of these or another communication network and protocol. In some embodiments, a pre-shared key (PSK) 111 may be stored in a secure memory 110. The PSK 111 may be embodied in a certificate associated with the native application 106 and may be installed in the device 100 at the time of manufacture. Presentation of the PSK 111 over a secure network connection via the communication function 108 may provide the bootstrap server 130 with a basis for a trust relationship with the native function 106 supported by the first module 104. Once the device 100 is in the field, the module 104 may use the PSK 111 to bootstrap the appropriate credentials and/or additional keys to connect to an operational server. The additional credentials provided during bootstrapping may include a URL or network address of the operational server 132. Additional keys may allow a secure network connection including authentication between the first module 104 and the operational server 132. After the bootstrapping is completed and the module 104 is connected to the operational server 132, beneficial operation may commence, such as reporting temperature and maintenance status for a kitchen refrigerator. Other examples abound.

To expand on the bootstrapping operation, the module 104 may send a message "A1" to the bootstrap server 130 and may use the PSK 111 for authentication and establishment of a secure channel. The bootstrap server 130, after this initial protocol, may send data to the module 104 in a message "A2" that may include the necessary operational data including new keys known to or shared with the operational server 132. The A2 message may also include a URL or network address so that the module 104 knows how to contact the operational server 132. With this information and the new keys, the module 104 may contact the operational server 132, establish its identity and begin to operate in its intended mode.

In some cases, however, a new module 120 may be introduced to the device 100, especially after the time of manufacture when a corresponding PSK would have been installed. The new module 120 may be introduced through a field update of the device 100 or activation of a latent capability post-manufacture, either at a dealership or distributor before delivery to an end-user. Alternatively, the new module 120 may be the result of the end-user installing a new feature or performing an upgrade of the device 100. Similar to the first or native module 104, the second module 120 may include an operational function 122, a communication function 124, storage 126 that may include secure storage, and a bootstrapping sub-module 128. In some cases, the new module 120 may not have a PSK to authenticate to either the bootstrap server 130 or the operational server 132. The lack of a PSK may be due to any number of reasons, including but not limited to, the second module 120 was not contemplated at the time of manufacture or the second module 120 is from another developer not associated with the original manufacturer.

This second module 120 may have no knowledge of its surroundings at the time of installation making it difficult for the module 120 to have accurate information for bootstrapping let alone operational functions. In such a case, the first module 104 may be able to detect and support the second module 120 via a sponsorship sub-module 112. In various embodiments, the discovery of the new second module 120 may follow many forms. For example, the native first module 104 may periodically attempt to discover the second module 120 via a polling operation or other discovery technique.

Similarly, the second module 120 may have a bootstrap sub-module 128 that supports discovery of the first module 104. This also may include polling or broadcasting over an internal bus or via a wireless network. In this regard, the device 100 may include a hardware identifier 129 or other universally unique identifier (UUID) may be used by both modules 104, 120 to identify each's actual affiliation so that modules across devices become incorrectly associated. For example, a shopping list function of a refrigerator may want to avoid affiliation with a home security system because the associated operational server 132 may not support both functions.

After discovery, the sponsorship sub-module 112 of the native first module 104 may send a credential to the bootstrap sub-system of the new non-native module 120 via a message "B1." The credential may be encrypted with a shared key or signed with a private key of the first module 104. The B1 message may also include the URL or other address of the operational server 132 for use by the second module 120. In other embodiments, the B1 message may include a nonce or other credential that is secured using the original PSK 111 embedded in the module 104 at the time of manufacture. This other credential may be used for further authentication of the registration request message from the second module 104, discussed immediately below.

Once the B1 message is received, the second module 120 may generate a request for registration message "B2." The B2 message may include the secured credential from the native first module 104 (and/or the other credential discussed above) and an identifier of the second module 104. The identifier may be or include a make/model number that can be used to ascertain the functions and capabilities of the second module 120. Additional information may be included in the B2 message, such as initial components for a Diffie-Hellman key exchange.

After the receipt of the B2 message, the operational server 132 may process the message and approve the addition of the second module 120 to the device 100. The information in the B2 message may be used to determine capabilities and message protocols for the second module 120. If no capability information can be determined or if the second module is on a block list, the request for registration may be denied and further communication from the second module 120 may be ignored or blocked. Further, the operational server 132 may send a message to the first module 104 to block or ignore further communication with the second module 120.

Because the contents of the B2 message from the second module 120 may be used as proof of association with the first module 104, the operational server 132 may treat the two modules 104, 120 as a single endpoint. In one embodiment, the second module may use the operational keys from the first module 104 for subsequent message transmissions. In another embodiment, the operational server 132 may generate new keys for the second module 120 or may request new keys from the bootstrap server 130, for example, referencing the PSK 111 optionally included in the B1 message. Once the new keys are installed in the second module 120, beneficial use of the second module may commence.

In an embodiment, the first module 104 may optionally send a pre-registration message "B3" to the operational server 132. The B3 message may be sent securely, for example, encrypted and signed, so that the operational server 132 may expect a future registration request from the second module 120. This direct message from the first module 104 to the second module 120 may have a higher level of trust because it has not been handled by the third party second module 120. Alternatively, the B3 message may be requested by the operational server 132 after B2 message is received from the second module 120. That is, the operational server 132 may contact the first module 104 after receipt of the B2 message as a way to confirm the association of the two modules 104, 120 as a single endpoint. This may help reduce the risk of a rogue module (not depicted) from gaining unauthorized access to the device 100 via the operational server 132.

Figure 2:
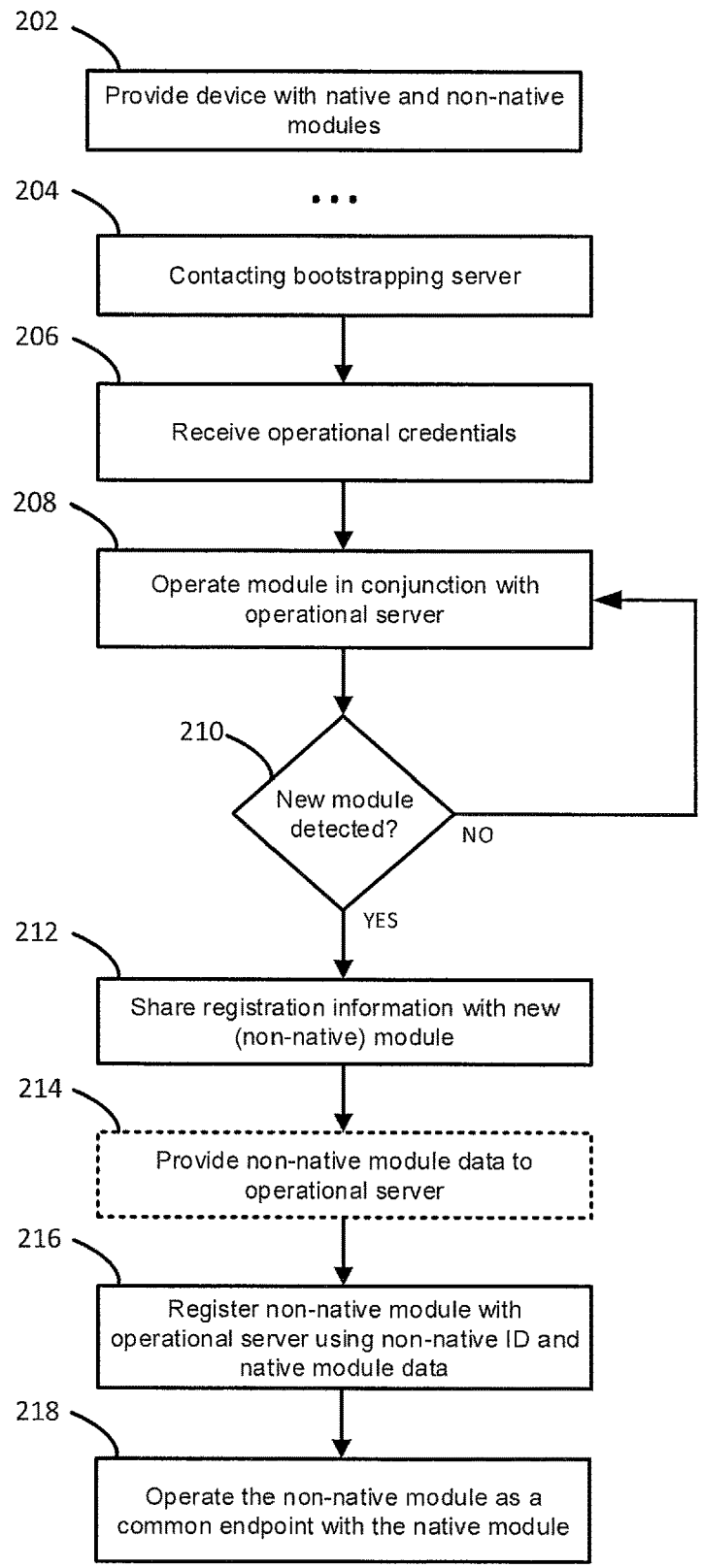
FIG. 2 is a flowchart of a method of multi-client support for an LwM2M device in accordance with the current disclosure.

FIG. 2 is a flowchart of an exemplary method 200 of providing multiple client support in an LwM2M environment. At block 202, a device 100 may be provided. The device 100 may include a first module 104 and a second module 120, each of which may support a function that interacts with the physical world. Such Internet of Things (IoT) devices may have sensors that collect data about an environment around them or may have actuators that interact with physical components in their environments. An IoT thermostat may be an example of one such device. Sensors determine the temperature of the environment and actuators control an HVAC unit to change the temperature to a set point. In an IoT device, communication with an external server may provide enhanced features such as outdoor temperatures for better modulation of temperature or data logging for determining energy usage.

IoT devices are in place or planned for an almost limitless array of real-world devices, from appliances to automobiles to cameras to industrial controllers and more. As discussed above, some devices 100 may be provisioned with a first or native IoT module 104. The module 104 may support the basic function of the module 104, for example, the exemplary thermostat. The native module 104 may include a pre-shared key (PSK) 111 for use in a process called bootstrapping. Bootstrapping, as discussed above, places the IoT device 100 into an operational state.

In some cases, an additional module 120 may be added or activated in the device 100 that was not originally provisioned. For example, a camera in the thermostat that was originally used to detect motion and sun load may be re-provisioned for home security. Such a new, non-native module 120 may not have the pre-provisioned keys required for bootstrapping. The method discussed below may be used to both place a non-native module 120 into service and to associate the non-native module 120 with the native module 104.

At block 204, the native module 104 may contact a bootstrapping server 130 using a pre-shared key (PSK) 111. The PSK 111 may be used for authentication and to secure a communication channel with the bootstrapping server 130. After authenticating and opening a communication channel, the bootstrapping server 130 may, at block 206, provide operational credentials to the native module 104. The operating credentials may include keys and an address for contacting and interacting with an operational server 132. The operational server 132, at block 208, may support beneficial use of the native module 104, for example using the thermostat, by providing external temperatures and logging HVAC cycles for cataloging energy usage. The operational server 132 may also support code updates to the native module 104.

At block 210, the native module 104 may check for a new, non-native module 120. As discussed above, the discovery process may originate in either direction. If no new module is present, execution may continue at block 208. If a new module is detected, execution may follow the 'yes' branch to block 212 where credentials from the native module 104 may be shared with the non-native module 120. Optionally, at block 214, information about the non-native module 120 may be shared with the operational server 132.

At block 216, the non-native module 120 may use the credentials provided by the native module 104 for registration with the operational server 132. Because the non-native module 120 uses the credentials from the native module 104 for its registration, the operational server 132 may associate the two modules 104, 120 as a single endpoint for subsequent operations, at block 218.

At least one technical effect is the ability to install and register additional functions in an IoT device 100 via a second module 120, where the second module 120 uses credentials from the first module for access to an operational server 132. This provides flexibility to expand the functions of the IoT device 100 over those originally provisioned with the device 100 at the time of manufacture. This may both extend the capabilities of the IoT device 100 as well as increase its service life through the post-manufacture installation of features and functions that may not have been contemplated at the time of manufacture.

The current system and method benefit both users and system providers by allowing field upgrades to IoT devices that, unlike a simple software update, allows the IoT device to perform new functions potentially using modules from manufacturers other than that of the IoT device itself.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computerized method of bootstrapping a non-native module in a device, the method comprising:
   providing the device with a native module and a non-native module;
   from the native module, contacting a bootstrap server associated with bootstrapping the native module;
   bootstrapping, via the bootstrap server, the native module using a pre-shared key (PSK) present in the native module;
   registering the native module to an operational server;
   establishing communication between the native module and the non-native module;
   providing a credential from the native module to the non-native module;
   from the non-native module, sending a message using the credential of the native module, to register the non-native module with the operational server; and
   placing the non-native module in service as a common endpoint of the native module.

2. The computerized method of claim 1, wherein the bootstrap server is a lightweight machine-to-machine (LwM2M) bootstrap server.

3. The computerized method of claim 2, wherein the operational server is an LwM2M server.

4. The computerized method of claim 1, wherein establishing communication between the native module and the non-native module comprises activating a service in the non-native module to discover the native module.

5. The computerized method of claim 1, wherein establishing communication between the native module and the non-native module comprises polling by the native module to discover the non-native module.

6. The computerized method of claim 1, wherein providing the credential from the native module to non-native module comprises:
   requesting the credential from the native module by the non-native module; and
   responding, by the non-native module, to a challenge presented by the native module, the challenge requiring input from a user.

7. The computerized method of claim 1, wherein providing the credential from the native module to non-native module comprises:
   receiving the credential from the native module responsive to discovery of the non-native module by the native module.

8. The computerized method of claim 1, wherein placing the non-native module in service as an extension of the native module comprises associating, at the operational server, the native module and the non-native module as a common endpoint.

9. The computerized method of claim 1, further comprising providing, by the native module, an identification message to the operational server, the identification message corresponding to the non-native module.

10. The computerized method of claim 9, wherein the identification message includes the credential from the native module and an identifier of the non-native module.

11. The computerized method of claim 1, wherein placing the non-native module into service comprises installing a key into the non-native module, the key associated with the operational server.

12. A device for use in an Internet-of-Things (IoT) application, the device comprising:
 a native module including:
  an native operational function;
  a native communication sub-module coupled to the native operational function that communicates with at least one external server,
 said at least one external server comprises a LwM2M server;
  a native secure storage area storing at least one pre-shared key; and
  a sponsorship sub-module that determines a presence of a non-native module and supports bootstrapping the non-native module;
 the non-native module including:
  an operational function;
  a memory storing at least a non-native module identifier;
  a communication sub-module that communicates with the at least one external server; and
  a bootstrap sub-module that communicates with the sponsorship sub-module, the bootstrap sub-module receiving a credential from the native communication sub-module and communicating the credential and the non-native module identifier to the at least one external server for registration.

13. The device of claim 12, further comprising a universally unique hardware identifier used by the bootstrap sub-module for communication with the at least one external server.

14. The device of claim 12, wherein the native operational function includes at least one of a sensor or an actuator.

15. The device of claim 12, where in the non-native module is coupled to at least one of a sensor or an actuator in the device.

16. A computerized method of bootstrapping a non-native module in a lightweight machine-to-machine (LwM2M) device, the method comprising:
 providing the LwM2M device with a native module and a non-native module;
 contacting a bootstrap server associated with bootstrapping the native module using an LwM2M protocol;
 bootstrapping, via the bootstrap server, the native module using a pre-shared key (PSK) present in the native module;
 registering the native module to an LwM2M operational server;
 establishing communication between the native module and the non-native module;
 providing a credential from the native module to the non-native module;
 from the non-native module, sending a message using the credential of the native module, to register the non-native module with the LwM2M operational server; and
 placing the non-native module in service in the LwM2M device based on the credential of the native module as a common endpoint with the native module.

17. The computerized method of claim 16, wherein the credential provided from the native module to the non-native module is encrypted using a key shared between the native module and the LwM2M operational server.

18. The computerized method of claim 16, wherein the credential provided from the native module to the non-native module is encrypted using the PSK.

19. The computerized method of claim 16, wherein registering the non-native module with the LwM2M operational server comprises sending a registration message from the non-native module to the LwM2M operational server, the registration message including the credential from the native module and an identifier of the non-native module.

20. The computerized method of claim 19, wherein the registration message further includes a hardware identifier of the LwM2M device.

\* \* \* \* \*